C. B. GUY.
Velocipede.

No. 93,433.  
Patented Aug. 10, 1869.

Witnesses.  
Wm Dean Overall  
Geo. W. Mabu

Inventor.  
C. B. Guy  
per Munn & Co

United States Patent Office.

C. B. GUY, OF POSTVILLE, IOWA.

Letters Patent No. 93,433, dated August 10, 1869.

---

IMPROVEMENT IN VELOCIPEDES.

---

The Schedule referred to in these Letters Patent and making part of the same.

---

*To all whom it may concern:*

Be it known that I, C. B. GUY, of Postville, in the county of Allamakee, and State of Iowa, have invented a new and improved Velocipede; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

Figure 1:
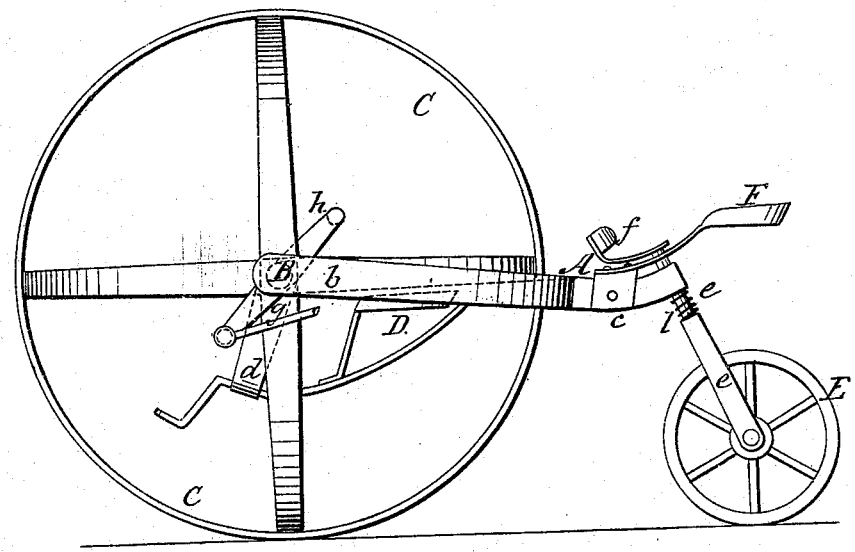
Figure 1 represents a side elevation of my improved velocipede.
Figure 2:
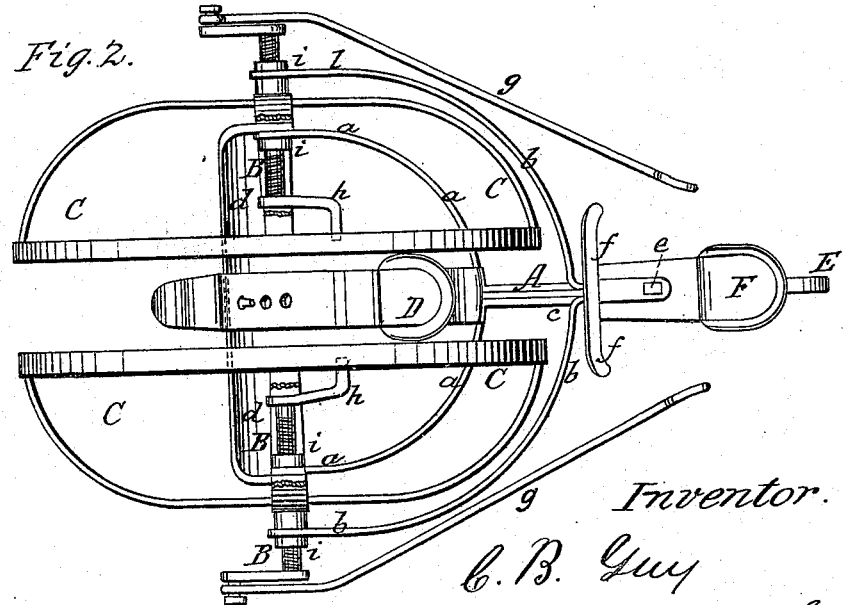
Figure 2 is a plan or top view of the same.

This invention relates to a new three-wheeled velocipede, adaptable to two or more persons, and operated by the hands of the driver.

The invention consists in the general construction and arrangement of parts as hereinafter more fully described.

A, in the drawing, represents the reach of the velocipede. It is mainly composed of two half hoops *a b*, which are secured to the shank *c*, and which are, at their ends, the supports of the driving-shafts B B.

These shafts carry the driving-wheels C C, which stand with the faces opposite each other.

The driver's seat D is secured upon the reach between the wheels.

The ends of the inner hoop *a* are connected by a cross-bar, *d*, which serves as a brace, and foot support.

In the rear shank *c* of the reach is swivelled a post, *e*, in which a caster-wheel, E, is hung.

On the upper end of the post *e*, is formed a steering-handle, *f*, by means of which the wheel E can be set in any desired direction.

A spring, *l*, is formed on the post *e*, for the support of the reach.

A detachable seat, F, is fitted upon the rear end of the reach. The person seated upon it can operate the wheel E for steering the machine, or may, by means of connecting-rods *g*, aid in revolving the shafts B. The driver on the seat D, propels the machine by turning the shafts B with the hands, cranks *h* being for this purpose arranged on said shafts.

The steering may also be done entirely by the action on the shafts B, without using the wheel E for that purpose, as when one shaft is held fast and the other revolved, the machine will be turned in a curve.

The shafts B are provided with screw-threads, and are held in place on the hoops *a b* by means of lock-nuts *i i*, as shown.

By turning these nuts, the shafts can be shifted in their bearings to bring the wheels C more or less apart, at the pleasure of the driver.

The wheels C are made of spring-metal spokes and rims, the spokes being convex, as shown, so that each wheel will be saucer-shaped, with the hollow on the inside.

Ample room is thus provided between the wheels for the accommodation of the driver, and still their rims can be brought quite close together, so that the two wheels will operate substantially as one.

Experts can bring the wheels close together, and will then have a machine adapted to operate substantially as a two-wheeled machine, while beginners will keep the wheels far enough apart to obtain the requisite balance.

Having thus described my invention,

What I claim as new, and desire to secure by Letters Patent, is—

1. A velocipede, consisting of a reach which has the semicircular extensions *a b*, in which the crank-shafts B have their bearings, and of the wheels C C and E, the wheels C being laterally adjustable, substantially as and for the purpose herein shown and described.

2. The saucer-shaped wheels C C, placed with their faces opposite, and adjustable substantially as herein shown and described, for the purpose as set forth.

C. B. GUY.

Witnesses:
J. B. JOHNSON,
A. A. ALLEN.